(12) United States Patent
Mikhaylik et al.

(10) Patent No.: US 6,706,449 B2
(45) Date of Patent: Mar. 16, 2004

(54) LITHIUM ANODES FOR ELECTROCHEMICAL CELLS

(75) Inventors: Yuriy V. Mikhaylik, Tucson, AZ (US); Christopher J. Sheehan, Tucson, AZ (US); Terje A. Skotheim, Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 100 days.

(21) Appl. No.: 10/025,651

(22) Filed: Dec. 18, 2001

(65) Prior Publication Data

US 2002/0187398 A1 Dec. 12, 2002

Related U.S. Application Data

(60) Provisional application No. 60/258,105, filed on Dec. 21, 2000.

(51) Int. Cl.⁷ .............................. H01M 2/16; H01M 4/40
(52) U.S. Cl. .................. 429/246; 429/208; 429/231.95; 429/232; 429/233; 429/245
(58) Field of Search ................. 429/208, 209, 429/212, 231.95, 232, 233, 245, 246

(56) References Cited

U.S. PATENT DOCUMENTS

| | | | |
|---|---|---|---|
| 4,515,931 A | 5/1985 | Olson et al. | |
| 4,533,710 A | 8/1985 | Olson et al. | |
| 4,586,111 A | 4/1986 | Cichanowski | |
| 4,615,961 A | 10/1986 | Park et al. | |
| 4,664,991 A | 5/1987 | Perichaud et al. | |
| 4,739,018 A | 4/1988 | Armand et al. | |
| 4,833,048 A | 5/1989 | Dejonghe et al. | |
| 4,842,893 A | 6/1989 | Yializis et al. | |
| 4,917,974 A | 4/1990 | De Jonghe et al. | |
| 4,954,371 A | 9/1990 | Yializis | |
| 5,066,554 A | 11/1991 | Hope et al. | |
| 5,162,175 A | 11/1992 | Visco et al. | |
| 5,194,341 A | 3/1993 | Bagley et al. | |
| 5,314,765 A | 5/1994 | Bates | |
| 5,324,599 A | 6/1994 | Oyama et al. | |
| 5,360,684 A | 11/1994 | Duval et al. | |
| 5,395,644 A | 3/1995 | Affinito | |
| 5,441,831 A | 8/1995 | Okamoto et al. | |
| 5,478,676 A | 12/1995 | Turi et al. | |
| 5,516,598 A | 5/1996 | Visco et al. | |
| 5,529,860 A | 6/1996 | Skotheim et al. | |
| 5,538,812 A | 7/1996 | Lee et al. | |
| 5,569,520 A | 10/1996 | Bates | |
| 5,601,947 A | 2/1997 | Skotheim et al. | |
| 5,648,187 A | * 7/1997 | Skotheim ................ 429/213 |

(List continued on next page.)

OTHER PUBLICATIONS

Dominey, "Cureent State of the Art on Lithium Battery Electrolytes", *Lithium Batteries, New Materials, Developments and Perspectives*, pp. 137–165, Elsevier, Amsterdam (1994), No month.

Alamgir et al., "Room Temperature Polymer Electrolytes", *Lithium Batteries, New Materials, Developments and Perspectives*, Chapter 3, pp. 93–136, Elsevier, Amsterdam (1994), No month.

*Primary Examiner*—Stephen Kalafut
*Assistant Examiner*—Tracy Dove
(74) *Attorney, Agent, or Firm*—Jacqueline M. Nicol; David E. Rogers; Squire, Sanders & Dempsey LLP

(57) ABSTRACT

Provided are anodes for use in electrochemical cells, wherein the anode comprises an anode active layer comprising lithium and a polymer anode substrate comprising a polymer film layer and a protective crosslinked polymer layer, in which the protective crosslinked polymer layer is in contact with the anode active layer on the side opposite to the surface in contact with the polymer film layer. The present invention also pertains to methods for forming such anodes and electrochemical cells comprising such anodes.

12 Claims, 1 Drawing Sheet

U.S. PATENT DOCUMENTS

| | | |
|---|---|---|
| 5,690,702 A | 11/1997 | Skotheim et al. |
| 5,723,230 A | 3/1998 | Naoi et al. |
| 5,731,104 A | 3/1998 | Ventura et al. |
| 5,783,330 A | 7/1998 | Naoi et al. |
| 5,792,575 A | 8/1998 | Naoi et al. |
| 5,882,819 A | 3/1999 | Naoi et al. |
| 5,961,672 A * | 10/1999 | Skotheim et al. .......... 29/623.5 |
| 6,117,590 A | 9/2000 | Skotheim et al. |
| 6,153,337 A | 11/2000 | Carlson et al. |
| 6,183,901 B1 * | 2/2001 | Ying et al. .................. 429/129 |
| 6,201,100 B1 | 3/2001 | Gorkovenko et al. |
| 6,302,928 B1 | 10/2001 | Xu et al. |
| 6,306,545 B1 | 10/2001 | Carlson et al. |
| 6,402,795 B1 * | 6/2002 | Chu et al. .................. 29/623.5 |
| 6,413,285 B1 * | 7/2002 | Chu et al. .................. 29/623.4 |
| 2001/0003863 A1 * | 6/2001 | Thibault et al. ........... 29/623.1 |

* cited by examiner

LITHIUM ANODES FOR ELECTROCHEMICAL CELLS

RELATED APPLICATION

This application claims priority to U.S. Provisional Patent Application Ser. No. 60/258,105, filed Dec. 21, 2000, the disclosure of which is incorporated by reference in its entirety for all purposes.

TECHNICAL FIELD

The present invention relates generally to the field of lithium anodes for use in electrochemical cells. More particularly, the present invention pertains to an anode for use in an electrochemical cell comprising an anode active layer comprising lithium and a polymer anode substrate comprising a polymer film layer and a crosslinked polymer protective layer in contact with the anode active layer. The present invention also pertains to methods of forming such anodes and electrochemical cells comprising such anodes.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

There has been considerable interest in recent years in developing high energy density batteries with lithium containing anodes. Lithium metal is particularly attractive as the anode of electrochemical cells because of its extremely light weight and high energy density, compared for example to anodes, such as lithium intercalated carbon anodes, where the presence of non-electroactive materials increases the weight and volume of the anode, and thereby reduces the energy density of the cells, and to other electrochemical systems with, for example, nickel or cadmium electrodes. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices, such as cellular phones and laptop computers, where a premium is paid for low weight.

It is still more advantageous to incorporate these features into thin film designs for several reasons. For example, the large surface area inherent in a thin film cell design allows high total currents to be passed with a modest current density, thereby dramatically enhancing the power capability of the cell, as well as reducing charging time. Low current densities are especially important for lithium electrodes, since plating (recharging) lithium at high currents may result in rough, high-surface-area, forms of lithium which decrease performance and may create a safety hazard.

In order to achieve high energy density, it is important to minimize the volume and weight of non-electroactive components in a battery, for example, components such as substrates for the electroactive materials. Organic polymers possess light weight and can be readily fabricated into thin films with desirable physical properties, such as flexibility, strength, and easy processability at moderate temperatures.

However, like most organic materials, most organic polymers will react with lithium metal; including polymeric materials, such as polyesters, which have desirable physical properties as thin film battery substrates. In U.S. Pat. No. 5,360,684 to Duval et al., an insulating band separating a lithium film from a metallic cathode current collector in an electrochemical cell is described. Examples of polymers for insulating bands include polyethylene, polypropylene, or materials such as polyester, Teflon, polyamide, with a thin surface coating of polyethylene or polypropylene.

There is still a need for improved polymeric materials that are light in weight, are as thin as possible, possess flexibility, and have better resistance to reaction with lithium metal for use as substrates and other components in thin film lithium electrochemical cells and batteries.

SUMMARY OF THE INVENTION

The anode of the present invention for use in an electrochemical cell comprises: (a) an anode active layer comprising lithium; and (b) a polymer anode substrate wherein the polymer anode substrate comprises a polymer film layer and a protective crosslinked polymer layer wherein the protective crosslinked polymer layer is in contact with the anode active layer comprising lithium on the side opposite to the surface in contact with the polymer film layer.

In one embodiment, the polymer film layer is a polyester film selected from the group consisting of polyethylene terephthalate, polyethylene naphthalate, 1,4-cyclohexanedimethylene terephthalate, and polyethylene isophthalate. In one embodiment, the polymer film layer is from 1 to 25 microns in thickness. In one embodiment, the polymer film layer is from 2 to 10 microns in thickness.

In one embodiment, the protective crosslinked polymer layer is formed from the polymerization of one or more monomers selected from the group consisting of alkyl acrylates, glycol acrylates, polyglycol acrylates, and polyol polyacrylates. In one embodiment, the protective crosslinked polymer layer is formed from the polymerization of one or more monomers selected from the group consisting of 1,6-hexanediol diacrylate, tripropylene glycol diacrylate, and trimethylol propane triacrylate. In one embodiment, the protective crosslinked polymer layer is from 0.01 to 4 microns in thickness. In one embodiment, the protective crosslinked polymer layer is from 0.1 to 2 microns in thickness. In one embodiment, the protective crosslinked polymer layer is from 0.01 to 0.5 microns in thickness.

In one embodiment, the anode comprises a metal current collector layer interposed between the protective crosslinked polymer layer and the anode active layer comprising lithium. In one embodiment, the metal current collector layer comprises a metal selected from the group consisting of copper and nickel.

In one embodiment, the anode active layer comprising lithium is from 5 to 50 microns in thickness.

Another aspect of the present invention pertains to methods of preparing an anode for use in an electrochemical cell, wherein the anode, as described herein, is formed by the steps of:

(a) depositing onto a polymer film layer a polymerizable layer comprising one or more monomers;

(b) polymerizing the polymerizable layer of step (a) to form a layer comprising a protective crosslinked polymer; and (c) depositing over the protective crosslinked polymer layer an anode active layer comprising lithium.

In one embodiment, the polymerizable layer of step (a) comprising one or more monomers is deposited by a method selected from the group consisting of flash evaporation and spin coating.

In one embodiment, the polymerization step (b) is initiated by an energy source selected from the group consisting of heat, ultraviolet light, visible light, infrared radiation, and electron beam radiation.

In one embodiment, subsequent to step (b) and prior to step (c), there is an additional step of depositing onto the protective crosslinked polymer layer, on the side opposite to the polymer film layer, a metal current collector, as described herein.

In one embodiment of the invention, after step (c) there is an additional step (d) of depositing on the anode active layer, on the side opposite from the protective crosslinked polymer layer, a single ion conducting protective layer.

A further aspect of the present invention pertains to an electrochemical cell comprising:

(a) a cathode comprising a cathode active material;

(b) an anode; and (c) a non-aqueous electrolyte interposed between the anode and the cathode, wherein the anode comprises:

(i) an anode active layer comprising lithium; and (ii) a polymer anode substrate, wherein the polymer anode substrate comprises a polymer film layer and a protective crosslinked polymer layer, wherein the protective crosslinked polymer layer is in contact with the anode active layer comprising lithium on the side opposite to the surface in contact with the polymer film layer.

As will be appreciated by one of skill in the art, features of one aspect or embodiment of the invention are also applicable to other aspects or embodiments of the invention.

DETAILED DESCRIPTION OF THE INVENTION

In the anodes of the present invention, a crosslinked polymer layer is interposed between an anode active layer comprising lithium and a polymer film layer of the polymer anode substrate. Such anodes are found to provide superior stability to lithium corrosion over conventional anodes in which lithium is in direct contact with the polymer film layer.

One aspect of the present invention pertains to an anode of an electrochemical cell, wherein the anode comprises: (a) an anode active layer comprising lithium; and (b) a polymer anode substrate, wherein the polymer anode substrate comprises a polymer film layer and a protective crosslinked polymer layer, wherein the protective crosslinked polymer layer is in contact with the anode active layer comprising lithium on the side opposite to the surface in contact with the polymer film layer.

Figure 1:
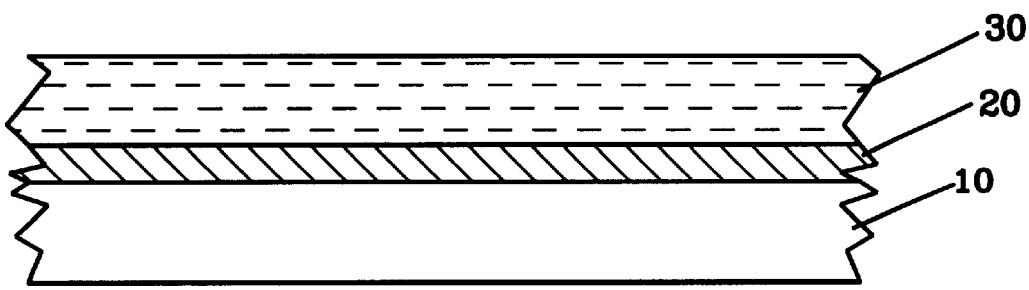
FIG. 1 shows a cross-sectional view of one embodiment of the anode of the present invention comprising: (a) a polymer film layer 10, (b) a protective crosslinked polymer layer 20, and (c) an anode active layer comprising lithium 30.

The polymer anode substrate of the present invention comprises a polymer film layer and a protective crosslinked polymer layer. Referring to FIG. 1, the protective crosslinked polymer layer 20 is interposed between the anode active layer comprising lithium 30 and the polymer film layer 10, such that the protective crosslinked polymer layer is in contact with the anode active layer on the side opposite to the surface of the protective crosslinked polymer layer that is in contact with the polymer film layer of the substrate.

Suitable polymer film layers for the polymer anode substrate of the anodes of the present invention include, but are not limited to, films of polyesters, such as polyethylene terephthalate (PET), polyethylene naphthalate (PEN), 1,4-cyclohexanedimethylene terephthalate, polyethylene isophthalate, and polybutylene terephthalate, and their copolyesters, films of polycarbonates, films of nylon, and films of polyimides. Preferred polymer film layers are polyester films. Most preferred polymer film layers are PET and PEN films.

The thickness of the polymer film layer of the polymer anode substrate may vary from about 1 to 100 microns. The choice of the thickness will depend on cell design parameters, such as the total thickness of the cell, the thickness of the anode active layer comprising lithium, and the thickness of the cathode electrode. In one embodiment, the thickness of the polymer film layer is from about 1 to 50 microns. In one embodiment, the thickness of the polymer film layer is from about 2 to 25 microns. In a preferred embodiment, the thickness of the polymer film layer is from about 2 to 10 microns.

In one embodiment of the present invention, the crosslinked polymer protective layer is deposited on the polymer film layer of the polymer anode substrate. The crosslinked polymer protective layer may be coated on either a single side or on both sides of the polymer film layer of the polymer anode substrate, depending on the anode design and cell configuration. The crosslinked polymer protective layer may comprise any of a variety of materials resistant to reaction with lithium and which can be deposited and polymerized in a uniform continuous thin film on the substrate. Examples of suitable materials include, but are not limited to, polymers formed, for example, as described in U.S. Pat. Nos. 4,842,893 to Yializis et al. and 5,395,644 to Affinito. Yializis et al. describe a process of forming a polymer film by depositing a vapor of a curable monomer, under vacuum, on a movable substrate which is mounted in thermal contact with a rotating drum which is maintained at a temperature below the boiling point of the vaporized monomer. The monomer vapor condenses on the surface of the substrate. Suitable monomer materials are relatively low in molecular weight, between 150 and 1000, preferably in the range of 200 to 300. These high-vapor pressure monomers, of vapor pressure of approximately $10^{-2}$ Torr at standard temperature and pressure, can be flash vaporized at relatively low temperatures and thus are not degraded by the heating process. When cured by a source of radiation, the films provide a continuous coating even in very thin films. This process, which is often referred to as the polymer multi-layer process (PML), may be used with a variety of monomers including, but not limited to, monofunctional and polyfunctional acrylates, such as those described in U.S. Pat. Nos. 4,515,931 and 4,533,710 to Olson et al.; 4,842,893 to Yializis et al.; and 4,586,111 to Cichanowski.

Preferred for the protective crosslinked polymer layers of the present invention, are polymer materials formed from the crosslinking polymerization of monomers including, but not limited to, alkyl acrylates, glycol diacrylates, polyglycol diacrylates, polyol polyacrylates, ethoxylated polyol polyacrylates, propoxylated polyol polyacrylates, polyglycol vinyl ethers, and polyglycol divinyl ethers. Suitable alkyl acrylates include, but are not limited to, hexyl acrylate, 2-ethylhexyl acrylate, and allyl methacrylate. Suitable glycol diacrylates include, but are not limited to, 1,4-butanediol diacrylate, 1,3-butylene glycol diacrylate, 1,6-hexanediol diacrylate, ethylene glycol diacrylate, and neopentyl glycol diacrylate. Suitable polyglycol diacrylates include, but are not limited to, diethylene glycol diacrylate, triethylene glycol diacrylate, tetraethylene glycol diacrylate, tripropylene glycol diacrylate, polyethylene glycol diacrylates, and polypropylene glycol acrylates. Suitable polyol polyacrylates include, but are not limited to, trimethylol propane triacrylate, pentaerythritol tetraacrylate, and pentaerythritol triacrylate. Preferred acrylate monomers are one or more selected from the group consisting of 1,6-hexanediol diacrylate, tripropylene glycol diacrylate, and trimethylol propane triacrylate.

The thickness of the crosslinked polymer protective layer of the present invention deposited per side on the polymer film layer may vary from about 0.01 microns to 6 microns. In one embodiment, the thickness of the crosslinked polymer protective layer is from about 0.01 microns to 4 microns. In one embodiment, the thickness of the crosslinked polymer protective layer is from about 0.1 microns to 2 microns. In one embodiment, the thickness of the crosslinked polymer protective layer is from about 0.01 microns to 0.5 microns.

The stability of anodes comprising an anode active layer comprising lithium and a polymer anode substrate, wherein the polymer anode substrate comprises a protective crosslinked polymer layer interposed between the anode active layer and the polymer film layer of the anode substrate, is greatly enhanced over anodes lacking the crosslinked polymer protective layer. For example, the anode film of Example 8 in which lithium is deposited on the surface of the protective crosslinked polymer layer of the anode substrate comprising a PET polymer film coated with a protective crosslinked polymer layer, formed from 1,6-hexanediol diacrylate, is stable. In contrast, when the surface of the same PET film lacks the protective crosslinked polymer layer described in Comparative Example 1, the PET anode film degrades quickly. A comparison of the films of Example 11 in which the anode substrate for the lithium layer is a coated PET film with a protective crosslinked tripropylene glycol diacrylate polymer layer with the PET films of Comparative Example 2 without the protective crosslinked polymer layer, shows the stability of the coated anode substrate whereas the uncoated polymer film becomes black and curls.

While not wishing to be bound by any theory, it is believed that a protective crosslinked polymer layer on the polymer film of the anode substrate prevents reaction between the polymer film, such as, for example a polyester film, and the lithium of the anode active layer. For example, it may be that components of the polymer film of the anode substrate, such as plasticizers, are reactive toward lithium metal and that the protective crosslinked polymer layer, by virtue of its crosslinked nature inhibits diffusion of the plasticizers into the lithium anode active layer and inhibits subsequent reaction between lithium and the plasticizers. Reaction of lithium metal with polymer film substrates or components of polymer film substrates, such as plasticizers, may result in degradation of critical properties required of anode substrate films in the fabrication of anodes and electrochemical cells from such anodes, such as mechanical strength, flexibility, and adhesion. This invention also pertains to a variety of non-electrochemical cell applications for depositing reactive materials, such as lithium, on polyester and other polymer film layers, where a protective crosslinked polymer layer, as described herein, prevents or reduces undesired reactions between deposited materials and the polymer film layer.

Figure 2:
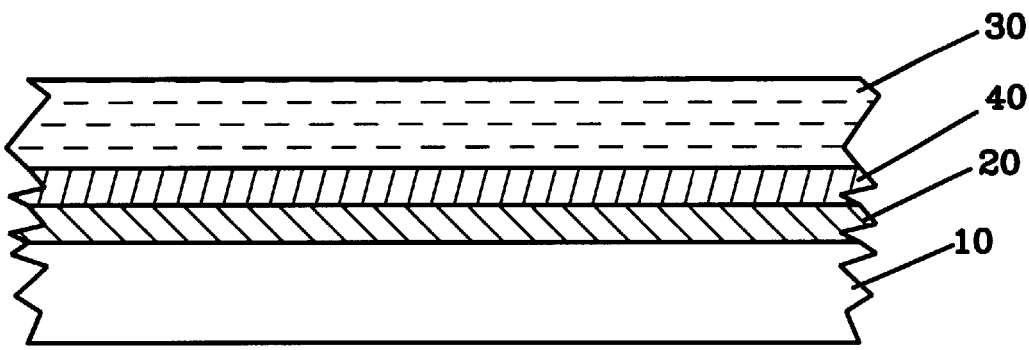
FIG. 2 shows a cross-sectional view of one embodiment of the anode of the present invention comprising: (a) a polymer film layer 10, (b) a protective crosslinked polymer layer 20, (c) a metal current collector layer 40, and (d) an anode active layer comprising lithium 30.

In one embodiment of the anode of the present invention, the polymer anode substrate may further comprise a metal current collector layer in contact with a surface of the crosslinked polymer protective layer, wherein the metal current collector layer 40 is interposed between the crosslinked polymer protective layer 20 and the anode active layer comprising lithium 30, as illustrated in FIG. 2. Examples of suitable metals for current collector layers of the present invention include, but are not limited to, copper, nickel, inconel, and stainless steel. Preferred metals for current collector layers are copper, nickel, and inconel.

The anode active layer of the anode of the present invention comprises lithium. The lithium may be in the form of a lithium metal foil or a thin film of lithium that is deposited onto the polymer anode substrate. If desirable for the electrochemical properties of the cell, the lithium may be in the form of an alloy of lithium, such as, for example, a lithium-tin alloy or a lithium-aluminum alloy. In one embodiment, the anode active layer comprises lithium metal.

The thickness of the anode active layer comprising lithium of the anodes of the present invention may vary from about 2 to 200 microns. The choice of the thickness will depend on cell design parameters such as the excess amount of lithium desired, cycle life, and the thickness of the cathode electrode. In one embodiment, the thickness of the anode active layer is in the range of about 2 to 100 microns. In one embodiment, the thickness of the anode active layer is in the range of about 5 to 50 microns. In one embodiment, the thickness of the anode active layer is in the range of about 5 to 25 microns. In one embodiment, the thickness of the anode active layer is in the range of about 10 to 25 microns.

In another embodiment of the present invention, the anode further comprises a single ion conducting protective layer in contact with the anode active layer comprising lithium on the side opposite from the polymer anode substrate. Examples of single ion conducting layers include, but are not limited to, inorganic, organic and mixed organic-inorganic polymeric materials. Single ion conducting layers have the capability of exclusively transporting cations, such as lithium ions, and may comprise polymers such as, for example, disclosed in U.S. Pat. No. 5,731,104 to Ventura et al. In one embodiment, the single ion conducting layer comprises a single ion conducting glass conductive to lithium ions. Among the suitable glasses are those that may be characterized as containing a "modifier" portion and a "network" portion, as known in the art. The modifier is typically a metal oxide of the metal ion conductive in the glass. The network former is typically a metal chalcogenide, such as for example, a metal oxide or sulfide.

Suitable single ion conducting layers include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides, and combinations thereof. In a preferred embodiment, the single ion conducting layer comprises a lithium phosphorus oxynitride. Electrolyte films of lithium phosphorus oxynitride are disclosed, for example, in U.S. Pat. No. 5,569,520 to Bates. A thin film layer of lithium phosphorus oxynitride interposed between a lithium anode and an electrolyte is disclosed, for example, in U.S. Pat. No. 5,314,765 to Bates. The selection of the single ion conducting layer will be dependent on a number of factors including, but not limited to, the properties of the electrolyte and cathode used in the cell.

In another embodiment of the present invention, the anode may further comprise an anode protective polymer layer in contact with the anode active layer comprising lithium on the side opposite from the polymer anode substrate. Suitable polymers include, but are not limited to, those selected from the group consisting of electrically conductive polymers, ionically conductive polymers, sulfonated polymers, and hydrocarbon polymers, and those described in U.S. Pat. No. 6,183,901 to Ying et al.

Methods of Making Anodes

Another aspect of the present invention pertains to a method of preparing an anode for use in an electrochemical cell, wherein the anode is formed by the steps of:

(a) depositing onto a polymer film layer a polymerizable layer comprising one or more monomers;

(b) polymerizing said polymerizable layer of step (a) to form a layer comprising a protective crosslinked polymer; and (c) depositing over the protective crosslinked polymer layer an anode active layer comprising lithium.

The polymerizable layer comprising one or more monomers may be deposited by any of the methods known in the art, such as, for example, flash evaporation, spin coating, extrusion coating, and roll coating. In one embodiment of the present invention, the polymerizable layer is deposited by a method selected from a group consisting of spin coating and flash evaporation. A most preferred method for deposition of polymerizable layers is a flash evaporation method, for example, as described in U.S. Pat. No. 4,954,371 to Yializis. Polymerization of the deposited polymerizable layer may be carried out by any of the methods known in the art for polymerization of monomers. In one embodiment of the present invention, the polymerization step is initiated by an energy source selected from the group consisting of heat, ultraviolet light, visible light, infrared radiation, and electron beam radiation. The deposition of the polymerizable layer comprising one or more monomers and the polymerization of the polymerizable layer to form a protective crosslinked polymer layer may be performed in a continuous process, for example, as described in U.S. Pat. No. 4,842,893 to Yializis et al.

The anode active layer of the anode of the present invention may be deposited by any of the methods known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation.

Preferably the deposition of the layers is carried out in a vacuum or non-contaminating atmosphere to minimize side reactions in the deposited layers which would introduce impurities into the layers or which may affect the desired morphology of the layers.

Preferred methods for the deposition of the anode active layer comprising lithium are those selected from the group consisting of thermal evaporation, sputtering, jet vapor deposition, laser ablation, and extrusion. In one embodiment, the anode active layer comprising lithium metal is deposited by thermal evaporation.

Electrochemical Cells

A further aspect of the present invention pertains to electrochemical cells comprising: (a) a cathode comprising a cathode active material; (b) an anode, as described herein; and (c) a nonaqueous electrolyte interposed between the anode and the cathode.

Suitable cathode active materials for use in the cathode of the electrochemical cells of the present invention include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

In one embodiment, the cathode active material comprises an electroactive sulfur-containing material. The term "electroactive sulfur-containing material," as used herein, relates to cathode active materials which comprise the element sulfur in any form, wherein the electrochemical activity involves the breaking or forming of sulfur—sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In one embodiment, the electroactive sulfur-containing material comprises elemental sulfur. In one embodiment, the electroactive sulfur-containing material comprises a mixture of elemental sulfur and a sulfur-containing polymer.

In one embodiment, the sulfur-containing material, in its oxidized form, comprises a polysulfide moiety, $S_m$, selected from the group consisting of covalent $—S_m—$ moieties, ionic $—S_m^-$ moieties, and ionic $S^{m2-}$ moieties, wherein m is an integer equal to or greater than 3. In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing material is a sulfur-containing polymer. In one embodiment, the sulfur-containing polymer has a polymer backbone chain and the polysulfide moiety, $S_m$, is covalently bonded by one or both of its terminal sulfur atoms as a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In a preferred embodiment, the electroactive sulfur-containing material comprises greater than 75% by weight of sulfur. In a more preferred embodiment, the electroactive sulfur-containing material comprises greater than 90% by weight of sulfur.

The nature of the electroactive sulfur-containing materials useful in the practice of this invention may vary widely, as known in the art of electroactive sulfur-containing materials. Examples of suitable sulfur-containing polymers include those described in: U.S. Pat. Nos. 5,601,947 and 5,690,702 to Skotheim et al.; U.S. Pat. Nos. 5,529,860 and 6,117,590 to Skotheim et al.; and U.S. Pat. No. 6,201,100 to Gorkovenko et al. Other suitable electroactive sulfur-containing materials comprising polysulfide linkages are described in U.S. Pat. No. 5,441,831 to Skotheim et al.; U.S. Pat. No. 4,664,991 to Perichaud et al.; and in U.S. Pat. Nos. 5,723,230, 5,783,330, 5,792,575, and 5,882,819 to Naoi et al. Still further examples of electroactive sulfur-containing materials include those comprising disulfide groups as described, for example, in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The cathodes of the cells of the present invention may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, carbon fabrics, metal mesh, and electrically conductive polymers. The amount of conductive filler, if present, is preferably in the range of 2 to 30% by weight. The cathodes may also further comprise other additives including, but not limited to, metal oxides, aluminas, silicas, and transition metal chalcogenides.

The cathodes of the cells of the present invention may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight.

The cathodes of the cells of the present invention may further comprise a current collector as is known in the art. Current collectors are useful in efficiently collecting the electrical current generated throughout the cathode and in providing an efficient surface for attachment of the electrical contacts leading to the external circuit as well as functioning as a support for the cathode. Examples of useful current collectors include, but are not limited to, those selected from the group consisting of metallized plastic films, metal foils, metal grids, expanded metal grids, metal mesh, metal wool, woven carbon fabric, woven carbon mesh, non-woven carbon mesh, and carbon felt.

Cathodes of the cells of the present invention may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler, binder, or other cathode additives; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode.

Examples of suitable liquid media for the preparation of the cathodes of the cells of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art, so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to substrates by any of a variety of coating methods known in the art and then dried using techniques, known in the art, to form the solid cathodes of the cells of this invention. Suitable hand coating techniques include, but are not limited to, the use of a wire-wound coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of means known in the art. Examples of suitable methods for the removal of liquid from the mixture include, but are not limited to, hot air convection, heat, infrared radiation, flowing gases, vacuum, reduced pressure, and by simply air drying.

The method of preparing the cathodes of the cells of the present invention may further comprise heating the electroactive sulfur-containing material to a temperature above its melting point and then resolidifying the melted electroactive sulfur-containing material to form a cathode active layer having redistributed sulfur-containing material of higher volumetric density than before the melting process, as described, for example, in U.S. Pat. No. 6,302,928 to Xu et al.

The electrolytes used in electrochemical or battery cells function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes. Examples of non-aqueous electrolytes for lithium batteries are described by Dominey in *Lithium Batteries, New Materials, Developments and Perspectives*, Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives*, Chapter 3, pp. 93–136, Elsevier, Amsterdam (1994).

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

Liquid electrolyte solvents are also useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to solvents, gelling agents, and polymers as known in the art for forming non-aqueous electrolytes, the non-aqueous electrolyte further comprises one or more ionic electrolyte salts, also as known in the art, to increase the ionic conductivity.

Examples of ionic electrolyte salts for use in the electrolytes of the cells of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and and the like. Other electrolyte salts useful in the practice of this invention include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, LiC(SO$_2$CF$_3$)$_3$, (LiS$_x$)$_z$R, and Li$_2$S$_x$, where x is an inter from 1 to 20, z is an integer from 1 to 3, and R is an organic group.

The electrochemical cells of the present invention may further comprise a separator interposed between the cathode and anode. Typically, the separator is a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in U.S. Pat. No. 6,153,337 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. Solid electrolytes and gel electrolytes may also function as a separator in addition to their electrolyte function.

In one embodiment, the solid porous separator is a porous polyolefin separator. In one embodiment, the solid porous separator comprises a microporous xerogel layer. In one embodiment, the solid porous separator comprises a microporous pseudo-boehmite layer.

Battery cells of the present invention may be made in a variety of sizes and configurations as known to those skilled in the art. These battery design configurations include, but are not limited to, planar, prismatic, jelly roll, w-fold, stacked, and the like.

The electrochemical cells comprising the anodes of the present invention may be either primary or secondary batteries or cells.

EXAMPLES

Several embodiments of the present invention are described in the following examples, which are offered by way of illustration and not by way of limitation.

Example 1

1,6-hexanediol diacrylate (available from Sartomer Company, Exton, Pa.) in which was dissolved 5 weight percent of photoinitiator ESCURE KTO-46 (a tradename for an initiator blend available from Sartomer Company, Exton, Pa.) was spin coated on a 5 inch diameter disc of 23 micron thick polyester film (PET), in an argon atmosphere. Irradiation with UV light converted the monomers into a crosslinked polymer coating of less than 1 micron in thickness.

Example 2

By the method of Example 1, a crosslinked polymer coating of the composition of Example 1 of 1–2 microns in thickness on a 23 micron thick PET film was obtained.

Example 3

By the method of Example 1, trimethylol propane triacrylate (available from Sartomer Company, Exton, Pa.) in which was dissolved 5 weight percent of KTO-46 photoinitiator was spin coated on a 23 micron thick PET film and converted into a crosslinked polymer coating of approximately 1 micron in thickness by UV irradiation.

Example 4

By the method of Example 3, a crosslinked polymer coating of the composition of Example 3 of 8 micron in thickness from trimethylol propane triacrylate on 23 micron PET was obtained.

Example 5

By the method of Example 1, di-trimethylol propane tetraacrylate (available from Sartomer Company, Exton, Pa.)

in which was dissolved 5 weight percent of KTO-46 photoinitiator was spin coated on a 23 micron thick PET film and converted into a crosslinked polymer coating of approximately 2–3 microns in thickness by UV irradiation.

Example 6

By the method of Example 1, SR 9041 penta acrylate (available from Sartomer Company, Exton, Pa.) in which was dissolved 5 weight percent of KTO-46 photoinitiator was spin coated on a 23 micron thick PET film and converted into a crosslinked polymer coating of approximately 3 microns in thickness by UV irradiation.

Example 7

A 6 micron thick PET film was coated by a vacuum flash evaporation process with tripropylene glycol diacrylate (available from Sartomer Company, Exton, Pa.) which was crosslinked by e-beam radiation to provide a crosslinked polymer coating of 0.8 micron in thickness.

Example 8

The crosslinked polymer coated film of Example 1 was positioned on the drum of a vacuum web coating system. The chamber was evacuated to $10^{-6}$ Torr. Lithium was deposited onto the crosslinked polymer layer surface of the substrate by e-beam evaporation with rotating the drum to give a 10 micron coating of lithium on the crosslinked polymer coated surface of the substrate. The appearance of the film of lithium deposited on the protective crosslinked polymer film coated PET substrate, viewed through the polymer film, was bright and showed no adverse reaction.

Comparative Example 1

By the method of Example 8, a 10 micron film of lithium was deposited on the 23 micron thick uncoated PET film substrate of Example 1. The film developed a black coloration and curled in less than a minute.

Examples 9–14

Comparative Examples 2 and 3

By the method of Example 8, lithium films were deposited on polyester films with or without protective crosslinked polymer films and the behavior of the materials observed, as shown in Table 1.

TABLE 1

Deposited Lithium Films

| Example | Substrate | Observation |
|---|---|---|
| Example 9 | Coated PET of Example 2 | Stable |
| Example 10 | Coated PET of Example 3 | Stable |
| Example 11 | Coated PET of Example 4 | Stable |
| Example 12 | Coated PET of Example 5 | Stable |
| Example 13 | Coated PET of Example 6 | Stable |
| Example 14 | Coated PET of Example 7 | Stable |
| Comparative Example 2 | Uncoated PET of Example 7 | Blackening and curling |
| Comparative Example 3 | Uncoated 6 micron PEN film | Severe degradation |

While the invention has been described in detail and with reference to specific and general embodiments thereof, it will be apparent to one skilled in the art that various changes and modifications can be made therein without departing from the spirit and scope thereof.

What is claimed is:

1. An anode of an electrochemical cell, wherein said anode comprises:
   (a) an anode active layer comprising lithium; and
   (b) a polymer anode substrate wherein said polymer anode substrate comprises a polymer film layer and a protective crosslinked polymer layer;
   wherein said protective crosslinked polymer layer is in contact with said anode active layer comprising lithium on the side opposite to the surface in contact with said polymer film layer.

2. The anode of claim 1, wherein said polymer film layer is a polyester film selected from the group consisting of polyethylene terephthalate, polyethylene naphthalate, 1,4-cyclohexanedimethylene terephthalate, and polyethylene isophthalate.

3. The anode of claim 1, wherein said protective crosslinked polymer layer is formed from the polymerization of one or more monomers comprising a monomer selected from the group consisting of alkyl acrylates, glycol acrylates, polyglycol acrylates, and polyol polyacrylates.

4. The anode of claim 1, wherein said polymer film layer is from 2 to 25 microns in thickness.

5. The anode of claim 1, wherein said polymer film layer is from 2 to 10 microns in thickness.

6. The anode of claim 1, wherein said protective crosslinked polymer layer is from 0.01 to 4 microns in thickness.

7. The anode of claim 1, wherein said protective crosslinked polymer layer is from 0.1 to 2 microns in thickness.

8. The anode of claim 1, wherein said anode active layer comprising lithium is from 5 to 50 microns in thickness.

9. The anode of claim 1, wherein said anode comprises a metal current collector layer interposed between said protective crosslinked polymer layer and said anode active layer comprising lithium.

10. The anode of claim 9, wherein said metal current collector layer comprises a metal selected from the group consisting of copper and nickel.

11. The anode of claim 1, wherein said anode comprises a single ion conducting protective layer in contact with said anode active layer comprising lithium on the side opposite from said polymer anode substrate.

12. An electrochemical cell comprising:
   (a) a cathode comprising a cathode active material;
   (b) an anode; and
   (c) a non-aqueous electrolyte interposed between said anode and said cathode, wherein said anode comprises:
      (i) an anode active layer comprising lithium; and
      (ii) a polymer anode substrate, wherein said polymer anode substrate comprises a polymer film layer and a protective crosslinked polymer layer wherein the protective crosslinked polymer layer is in contact with said anode active layer comprising lithium on the side opposite to the surface in contact with said polymer film layer.

* * * * *